United States Patent [19]

Zinn

[11] Patent Number: 4,669,099
[45] Date of Patent: May 26, 1987

[54] DIGITAL FREQUENCY MULTIPLIER

[75] Inventor: Alfred W. Zinn, Monsey, N.Y.

[73] Assignee: The Singer Company, Little Falls, N.J.

[21] Appl. No.: 787,571

[22] Filed: Oct. 15, 1985

[51] Int. Cl.[4] ............................................. H03B 19/00
[52] U.S. Cl. ...................................... 377/47; 307/265; 307/271; 364/703; 328/20
[58] Field of Search ...................... 377/47; 328/20, 15; 307/265, 271; 364/703

[56] References Cited

U.S. PATENT DOCUMENTS 4,077,010  2/1978  Ryon ....................................... 377/47
4,563,741  1/1986  Matsumura ............................ 328/20

OTHER PUBLICATIONS

RCA Technical Notes No. 736, Jan., 1968 "Digital Multiplier" by Merson.

Primary Examiner—John S. Heyman
Assistant Examiner—Karl Ohralik
Attorney, Agent, or Firm—Thomas W. Kennedy

[57] ABSTRACT

A square wave with a 50% duty cycle which has frequency twice that of an input square wave also having a 50% duty cycle is obtained by generating from the incoming square wave two waveforms having 75% duty cycles with the two waveforms 180° out of phase with each other. The two waveforms are combined in an ANDing operation to obtain an output waveform which is a square wave with twice the frequency of the incoming square wave. In similar fashion, using additional similar circuits and gating, tripling is possible.

16 Claims, 7 Drawing Figures

DIGITAL FREQUENCY MULTIPLIER

This invention relates to digital circuits in general and more particularly to an improved digital frequency multiplier.

Known circuits for mulitplying digital frequency suffer from numerous disadvantages. In general, known methods required analog circuits. For this reason, it is difficult or impossible to implement them in an LSI array, because they do not lend themselves to incorporation in standard arrays. Typically known methods include analog circuits in which the peak, valley and crossover of a sine wave are detected and utilized to generate twice the frequency. Another technique uses a phase-locked loop circuit, requiring a voltage control oscillator, phase comparator, filter and counter to generate the increased frequency. Finally, frequency multipliers can be accomplished utilizing circuits in which a fundamental frequency is converted to a saw tooth, and the sawtooth is then applied to a tuned circuit and a harmonic, e.g., the second harmonic, extracted and amplified to provide a multiple of the frequency.

In the analog method, a further disadvantage is that a somewhat nonlinear result occurs because of the nonlinearity of the sine wave. Even when the sine wave is applied to a comparator, the output mark—space ratio is not 1. In other words, it is not a square wave. When using the phase-locked loop circuit, there is a time delay in readjusting to a new incoming frequency. In addition, these circuits generally require additional power supply voltages, aside from a logic level, to operate.

SUMMARY OF THE INVENTION

The present invention provides an all digital frequency multiplier, which avoids these difficulties. The basic element of the present invention is a frequency doubler. From the frequency doubler, frequency triplers and multipliers of higher order can be constructed. With an incoming square wave waveform with a 50% duty cycle and an initial frequency F, in accordance with the present invention, a first waveform which is on for the first three quarters of the cycle and off for the last quarter of the cycle is formed. A similar waveform is formed which is on for the first three quarters of a cycle of the inverted incoming frequency and off for the final quarter cycle. This second waveform is thus 180° out of phase with the first waveform. When these two waveforms are ANDed, a frequency which is twice the incoming frequency results.

In order to form the waveforms having the 75% duty cycle, i.e., which are on for the first three quarters of a cycle and off for the last quarter, a frequency at least an order of magnitude higher, but preferably much higher, e.g., 2000 times the frequency being doubled and, by dividing in half, a frequency half that value are first established. Two up/down counters are provided. One counter is controlled as to its up/down direction by the incoming waveform, the other counter is controlled by the inverse of the incoming waveform.

During the first half cycle, the first counter counts up at the lower frequency. In other words, it counts from one-half cycle. It then counts down on the second half cycle but at the higher frequency, i.e., double the frequency at which it counted up. Thus, it counts down in half the time, i.e., one-half of a half cycle or one-quarter of a cycle. When the count reaches zero, this is detected and the counter put in a reset condition and held there for the remainder of the half cycle. In general, if $f_1$ is the first frequency which is counted up and $f_2$ is the second frequency counted down, the duty cycle will be $2f_1/(f_1+f_2)$.

The detection is done by means of detecting when the counter is busy or has a non-zero count. This output, which is one state for a non-zero count and the other state for a zero count, then, is used as a circuit output. In the meantime, during the first half cycle of operation, when the circuit first starts, the second clock is held off. During the second half cycle and every subsequent even half cycle, while the first counter is counting down the second counter counts up at the lower frequency. Subsequently, during each odd half cycle when the first counter is counting up, the second counter will be counting down. In all other respects, its operation is the same as the first counter and the result is two waveforms, each with a 75% duty cycle but offset from each other by a half cycle. When these two waveforms are combined in a NAND gate, the result is a waveform at twice the incoming frequency.

In order to provide a frequency tripler, the present invention combines two of the frequency doubler circuits. In this case, in the first circuit, instead of dividing the frequency in half, there is the division by 3. Thus, two waveforms with 4/6 duty cycle and 180° out of phase are formed. The second counter has a divided by 3 and a divided by 2 input. This forms waveforms with a 5/6 duty cycle. The resulting waveforms along with the incoming waveform are combined through gates, in this case, through ORing and exclusively ORing to obtain the final waveform which is three times the frequency of the incoming waveform.

In a similar manner, other multiples of the input frequency can be achieved by choosing other duty cycles for the two basic output waveforms and ANDing and/or ORing them appropriately.

Unlike prior art circuits, the digital frequency multiplier of the present invention is entirely digital and therefore lends itself into incorporation in the standard LSI logic array and thus to miniaturization. It can also be constructed as an MSI device for use in logic design. For example, a dual inline package with the ability to obtain double and triple frequency along with other multiples through feeding back can be constructed. Any desired multiple which can be made up from multiples of 2 or 3, thus, become possible with the only practical limitation being the mark-space accuracy requirements of a particular application.

In the digital circuit of the present invention, no filtering is required and thus, the analog components necessary in a phase-locked loop or analog circuit are eliminated. Because of the digital nature of the circuit, the nonlinearities or unequal time periods of half cycles which would otherwise result are minimized or completely eliminated. In comparison to a phaselocked loop circuit, there is no capture problem. Furthermore, only a single 5 volt supply is required and the circuit is relatively temperature insensitive as compared to analog circuits used for the same function.

DETAILED DESCRIPTION

Figure 1:
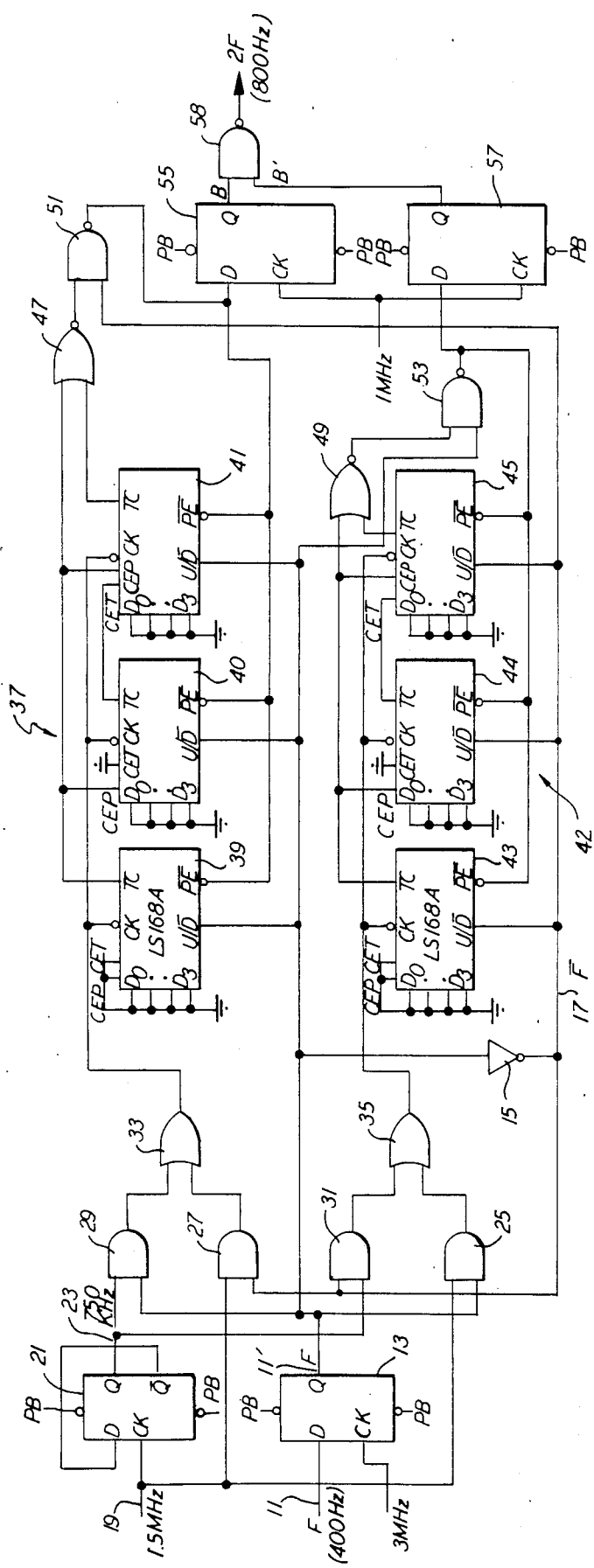
FIG. 1 is a logic diagram of a frequency doubler according to the present invention.
Figure 2:
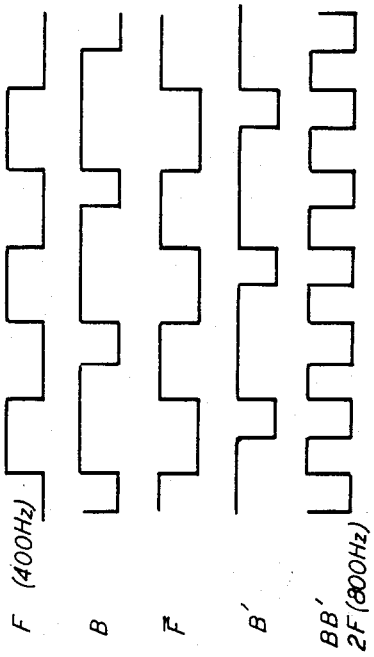
FIG. 2 is a waveform diagram showing the waveforms of FIG. 1.

FIG. 1 is a logic diagram of a frequency doubler circuit according to the present invention. In the illustrated embodiment, the circuit is adapted for doubling of an incoming square wave frequency of 400 Hz. This is designated as the input F on line 11. A D-type flip-flop 13 performs the function of a deglitching circuit. Thus, the incoming frequency waveform F, also shown in FIG. 2, is clocked through the D flip-flop at a rate of 3 MHz. As a result, the signal on line 11', the output of flip-flop 13, also represents the signal F. This signal is inverted through an inverter 15 to give the signal $\bar{F}$ on line 17. The frequency used for counting purposes is a frequency of 1.5 MHz on line 19. This frequency is divided in D-type flip-flop 21 to give an output on line 23 of 750 kHz. The 1.5 MHz signal is an input to AND gate 25 and to AND gate 27. The 750 kHz signal is an input to AND gate 29 and to AND gate 31. The outputs of AND gates 27 and 29 are ORed together in OR gate 33 and the outputs of AND gates 25 and 31 ORed together in OR gate 35. This combination of AND gates and OR gates comprises a frequency selector to select between the 1.5 MHz frequency and the 750 kHz frequency.

The output of gate 33 is the input to a counter 37 made up of stages 39, 40 and 41. Similarly, the output of gate 35 is the input to a counter 42 made up of stages 43, 44 and 45. Each of the stages 39–41 and 43–45 is a four-bit up/down counter. The up/down inputs of the stages 39–41 are coupled to the signal F on line 11'. The up/down inputs to the counters stages 43–45 are coupled to the $\bar{F}$ signal on line 17. The illustrated counters are presetable and have their preset inputs D0–D3 coupled to ground. When a logic "0" signal is applied on the input labeled $\overline{PE}$, the preset value is loaded into the counter stages. The counters are synchronous counters so that each of the stages 39–41 or 43–45 has it clock input coupled to its associated gate 33 or 35. The carry output of the first stage 39 labeled TC is coupled as an enable input to the stage 40 with its carry TC coupled as an enable input to the stage 41. The carry outputs of stages 39 and 41 are inputs to a NOR gate 47. Similarly, the carry output of stage 43 enables stage 44 and the carry output of stage 44 enables stage 45. Again, the carry outputs of stage 43 and 45 are coupled into a NOR gate 49. The output of NOR gate 47 is one input to a NAND gate 51 having as its second input the $\bar{F}$ signal on line 17. Similarly, the output of gate 49 is an input to NAND gate 53 having as its second input the F signal on line 11'.

The output of NAND gate 51 is fed back as the preset enable signal for stages 39–41 and the output of gate 53 fed back as the preset enable signal for stages 43–45. The output of gate 51 is deglitched through D-type flip-flop 55 and the output of gate 53 through flip-flop 57. The two flip-flop outputs are coupled through a NAND gate 58.

Operation can be understood with reference to FIG. 2. During the first half cycle, the signal F is a logic "1" and the signal $\bar{F}$ a logic "0". As a result, gates 25 and 29 are enabled. Gate 29, thus, passes the 750 kHz signal to the counter 37. Gate 25 passes the 1.5 MHz signal, through gate 35 to the counter 42. Since $\bar{F}$ is a logical "0", the output of NAND gate 51 will be a logic "1" and the preset enable signal which was previously present will be removed to allow counter 37 to begin counting. This logic "1" signal will also be transferred to the output of flip-flop 55 which is designated as the signal B. Counter 37 continues to count up at the 750 kHz frequency for the full half cycle. With respect to counter 42, NOR gate 49 will have a "1" output and the signal F on line 11' is "1". Therefore, during this first half cycle, counter 42 will be held in the preset state.

On the second half of the cycle the signal F becomes a logic "0" and the signal $\bar{F}$ a logic "1". Counter 37 is now enabled to count down and counter 42 to count up. Counter 42 will count up at the lower frequency and counter 37 will count down at the higher, 1.5 MHz frequency. Now, the signal on line 17 into NAND gate 51 is a logical "1". When the count in counter 37 reaches a count of zero, the output of NOR gate 47 will also become a logic "1", causing the output of NAND gate 51 to become a logic "0". This will cause the preset enable line to become active causing the preset value of all "0"s to be loaded into the counters and held there for the remainder of the half cycle. Because the counting was done at twice the frequency, it will be done in half the time. Therefore, it will take one-quarter of the cycle to count down to zero. This change in state will be transferred through the deglitching flip-flop 55 and will appear as shown in FIG. 2 on wave form B. During this period, counter 42 continues to count up at the lower frequency.

For the next half cycle, since the count is no longer zero, the counter 42 will not be held in the preset state, but now will count down. The result at the output of flip-flop 57 is the waveform B'. Operation is the same as described above in connection with counter 37, the only difference being that there is an offset of 180°. The two outputs B and B' when combined through NAND gate 58 thus give the complement of the waveform shown in FIG. 2 as B B' which is a square wave having twice the frequency of the input waveform F. An inverter (not shown) when connected to the output of NAND gate 58 will provide the waveform BB' shown in FIG. 2.

Figure 3:
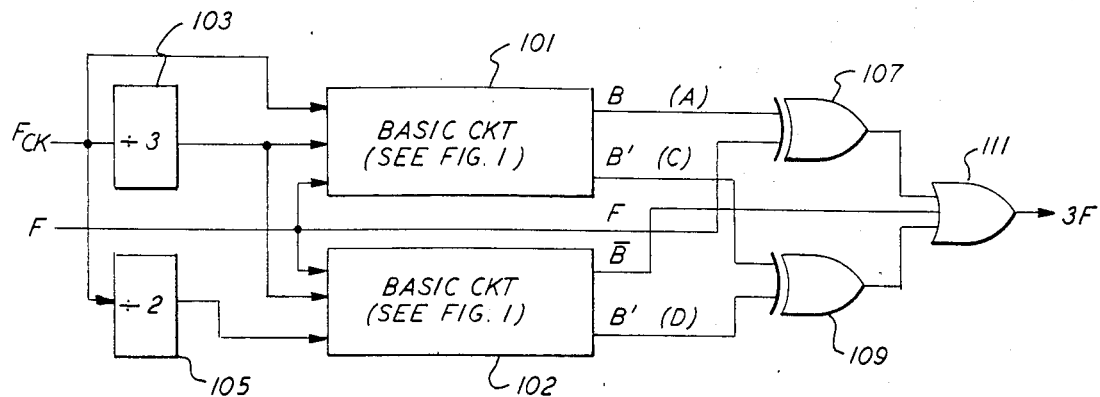
FIG. 3 is a block diagram of a frequency tripler according to the present invention.
Figure 4:
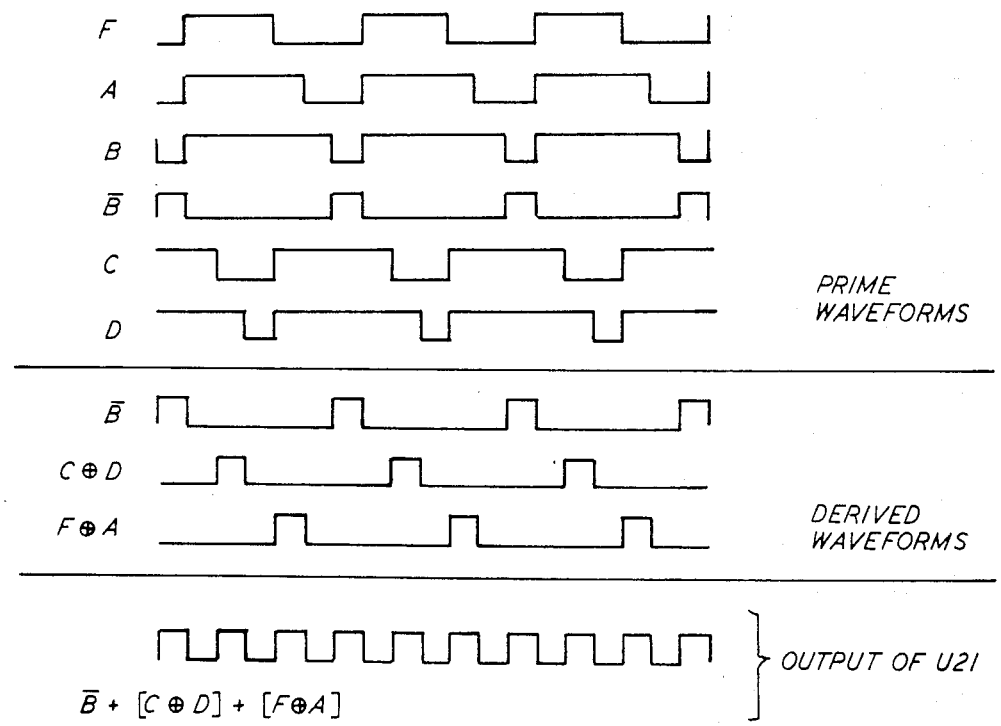
FIG. 4 is a waveform diagram showing the waveforms of FIG. 3.

FIG. 3 is a block diagram and FIG. 4 a waveform diagram of a frequency tripler according to the present invention. As illustrated, there are two basic circuits 101 according to FIG. 1. This includes everything in FIG. 1 except the divider flip-flop 21 and the final output gate 58. The signals corresponding to the signals designated as B and B' in FIG. 1 are designated A and C for the first circuit and B and D for the second circuit. In the case of B, rather than taking the Q output of flip-flop 55 of FIG. 1, the $\bar{Q}$ output, i.e., $\bar{B}$ is taken.

From the waveforms of FIG. 4, the operation of the circuit can be seen. The input to the circuit 101 is either from the divide by 3 frequency divider 103 or the full clock frequency which is three times as high. Thus, during the first half cycle, the counter counts up at the lower frequency. Then beginning with the beginning of the second half cycle it begins to count down at a frequency three times as fast. This then takes one-third the time and the waveform A is high for one-half plus one-third of one-half or is high for 4/6 of the total cycle.

The waveform C, as in the previous case is the same shape as the waveform A but shifted by 180°.

The frequencies into the circuit 102 are the frequency divided by 3 and the frequency divided by 2. Thus, counting up will be done at the frequency divided by 3 and counting down at the frequency divided by 2. The result shown as waveform B will be a waveform in which the output B remains high for 5/6 of the cycle. This waveform inverted is shown as waveform B̄. The waveform D is shifted 180° with respect to waveform B̄ for the reasons explained previously. The incoming frequency signal F and the signal A are ORed in exclusive OR gate 107 to give the waveform indicated in FIG. 4 by that exclusive ORing. Similarly, the waveforms C and D are exclusively ORed in OR gate 109 to give that waveform. These two waveforms and the waveform B̄ are combined in OR gate 113 to give the final output at a frequency three times that of the input frequency.

Figure 5:
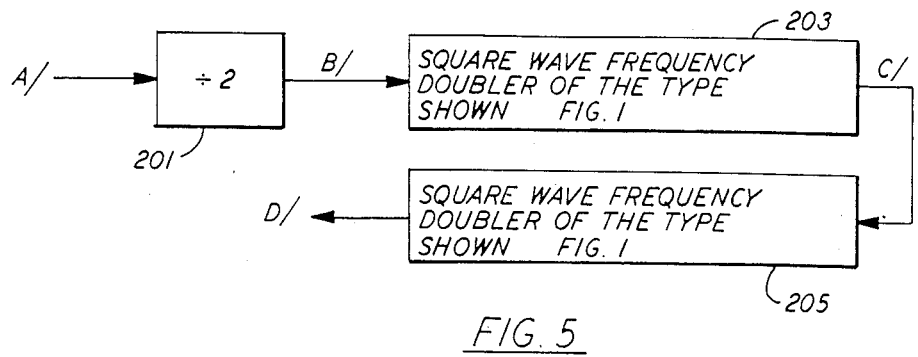
FIG. 5 is a block diagram of a circuit for converting a non-50% duty cycle waveform to a 50% duty cycle at twice the frequency.
Figure 6:
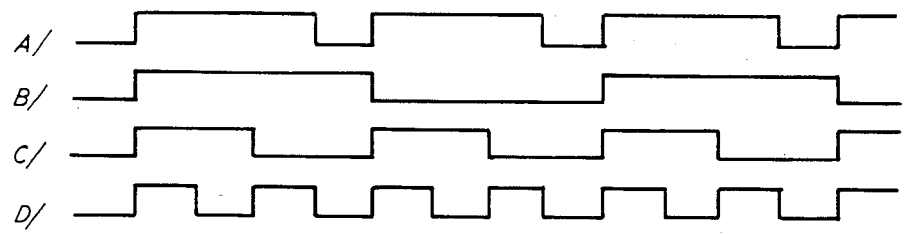
FIG. 6 illustrates the waveforms associated with FIG. 5.

The explanations above assume that incoming waveform is a 50% duty cycle waveform. FIG. 5 illustrates the manner in which a square wave frequency doubler with a 50% duty cycle can be accomplished independent of the duty cycle of the incoming waveform. FIG. 6 provides the associated waveforms. As shown by FIG. 6, the incoming waveform A has approximately a 75% duty cycle. This waveform is divided by 2 in a divide by 2 counter to obtain waveform B. This division converts it into a waveform at one-half the frequency but with a 50% duty cycle. This waveform is then provided as an input to a frequency doubler 203 according to FIG. 1 and its output to another frequency doubler 205 according to FIG. 1. The resulting waveforms C and D, respectively, are shown in FIG. 6.

Figure 7:
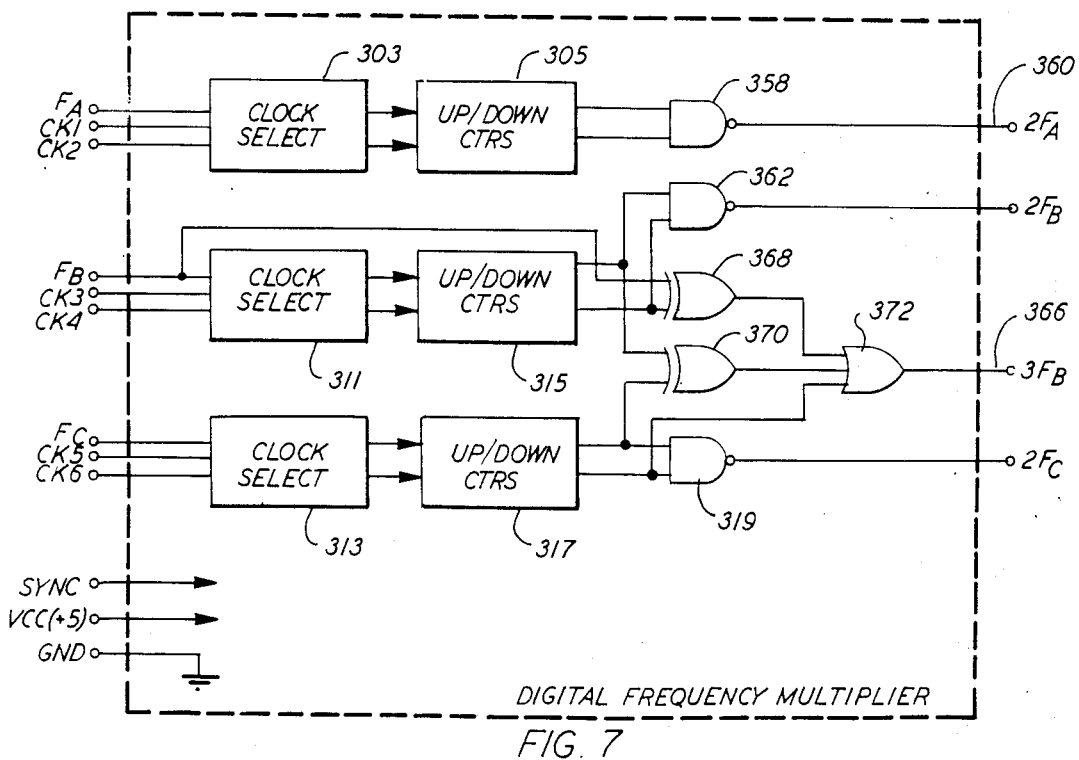
FIG. 7 illustrates a possible MSI configuration of circuits according to the present invention.

FIG. 7 illustrates a possible configuration of an integrated circuit which can be marketed as a frequency multiplier. The illustrated circuit contains three sets of inputs, each comprising an input for a frequency to be multiplied, and two clock inputs. These correspond to the clock input line 19 and line 23 of FIG. 1, for example. Thus, in the case of FIG. 1, the inputs would be the frequency to be doubled, e.g., 400 Hz, and the two frequencies for the counters, e.g., 1.5 MHz and 750 kHz. These are then coupled to the clock select circuits 303 and into the up/down counters 305, the final outputs being combined in gate 358 giving output on line 360 of 2 times the input frequency FA.

The next two arrangements which include select logic 311 and 313 and up/down counters 315 and 317 are arranged to provide either outputs from NAND gates 362 and 364 at twice the input frequency FB or FC or to provide a frequency tripler output on line 366. This frequency tripler output is obtained in the manner described previously using exclusive OR gates 368 and 370 combined with OR gate 372. In that case, the input frequencies FB and FC would both be, e.g., 400 Hz, and the respective clock inputs would be, for example, 1 MHz, 3 MHz, 1.5 MHz and 1 MHz. The circuit also shows a sync input which is the input used for clocking flip-flops, such as the flip-flops 13 and 57 of FIG. 1, along with voltage and ground inputs in conventional fashion. By feeding back output frequencies to the input, other mulitples can be obtained. For example, 2FA can be fed back to FB and FC to result in 3FB or 6FA.

What is claimed is:

1. The method of generating a square wave with a 50% duty cycle which has frequency twice that of an input square wave also having a 50% duty cycle comprising:
   (a) generating from said incoming waveform two waveforms having 75% duty cycles with said two waveforms 180° out of phase with each other; and
   (b) combining said two waveforms in an ANDing operation to obtain an output waveform which is a square wave with twice the freqecy of the incoming square wave, wherein said step of generating said waveforms with a 75% duty cycle comprises:
      (a) providing a first counting frequency at least an order of magnitude greater than the frequency to be converted;
      (b) providing a second counting frequency which is one half said first counting frequency;
      (c) on a first half cycle incrementing a first count at said second frequency for the duration of said first half cycle;
      (d) on a second half cycle decrementing the count obtained on the first half cycle at said first frequency until reaching zero and holding it at zero for the remainder of said second half cycle;
      (e) forming said first 75% duty cycle waveform such that it is in one logic state during the period in which said count is incremented and then decremented and in the other state for the remainder of said second half cycle after said count reaches zero;
      (f) during said second half cycle of said incoming waveform incrementing a second count at said second frequency;
      (g) during the third half cycle incrementing said first count at said second frequency and decrementing said second count at said first frequency until said second count reaches zero and holding it at zero for the remainder of said third half cycle;
      (h) establishing said second 75% duty cycle waveform such that it is in said first state during the period that said second count is incrementing then decrementing and in the opposite state during the portion of said third cycle after said count reaches zero; and
      (i) continually repeating steps (d)-(h).

2. The method of tripling a frequency of an incoming 50% duty cycle square wave comprising:
   (a) establishing a first counting frequency which is at least an an order of magnitude greater that the frequency to be tripled;
   (b) establishing a second counting frequency which is one-third of said first counting frequency;
   (c) establishing a third counting frequency which is one-half said first counting frequency;
   (d) on a first half cycle incrementing a first count at said second frequency for the duration of said first half cycle;
   (e) on a second half cycle decrementing said first count obtained on the first half cycle at said first frequency until reaching zero and then holding said count at zero;
   (f) forming a first output waveform such that it is in one state during the period in which said first count is incremented and then decremented and in the other state for the remainder of said second half cycle after said first count reaches zero;
   (g) during said second half cycle of said incoming waveform incrementing a second count at said second frequency;

(h) during the third half cycle incrementing said first count at said second frequency and decrementing said second count at said first frequency until it reaches zero;

(i) establishing a second output waveform such that it is in said first state during the periods that said second count is incrementing then decrementing and is in the other state during the portion of said third-half cycle after said second count reaches zero;

(j) continually repeating steps (e)–(h);

(k) on said first half cycle incrementing a third count said second frequency for the duration of said first half cycle;

(l) on said second half cycle decrementing said third count obtained on the first half cycle at said third frequency until reaching zero and then holding said third count at zero;

(m) forming a third output waveform such that it is in one state during the period in which said third count is incremented and then decremented and in the other state for the remainder of said second half cycle after said third count reaches zero;

(n) during said second half cycle of said incoming waveform incrementing a fourth count at said second frequency;

(o) during said third half cycle incrementing said third count at said second frequency and decrementing said fourth count at said third frequency until it reaches zero;

(p) establishing a fourth output waveform such that it is in said first state during the periods that said fourth count is incrementing then decrementing and in the other state during the portion of said third-half cycle after said fourth count reaches zero;

(q) exclusively ORing the incoming square wave with said first output waveform to obtain a fifth output waveform;

(r) exclusively ORing said second output waveform with said fourth output waveform to obtain a sixth output waveform; and (s) ORing said fifth output waveform, said sixth output waveform output and the inverse of said third output waveform.

3. Apparatus for generating from an input 50% duty cycle square wave waveform a pair of waveforms which are 180° out of phase with each other and which have a duty cycle equal to $2f_1$ divided by $f_1+f_2$ where $f_1$ and $f_2$ are first and second counting frequencies comprising:

(a) a selection circuit having as inputs said first and second counting frequencies and controlled by the incoming waveform, said circuit providing first and second outputs, said first output alternating, on alternating half cycles of the incoming waveform between said first and second frequencies, and said second output similarly alternating between said first and second frequencies on alternate half cycles, said outputs being such that when said first output is at said first frequency said second output is at said second frequency and when said second output is at said first frequency said first output is at said second frequency;

(b) first and second up/down counters having as inputs said first and second output of said selection circuit, said first counter having its up/down input coupled to the incoming waveform, and said second counter having its up/down input coupled to the inverse of said incoming waveform;

(c) first and second detectors, associated with said first and second counters for detecting when a respective counter has reached a count of zero after having had a positive or negative count;

(d) means responsive to outputs from said first and second detectors, respectively, to maintain the count in said counters at zero for the remainder of the half cycle in which a zero count is detected; and (e) means for generating first and second output waveforms from the outputs of said first and second counters, which outputs are in a first state when a non-zero count is detected and in a second state when a zero count is detected, said first and second waveforms having said duty cycles and being 180° out of phase with each other.

4. Apparatus according to claim 3, wherein said selection circuits each comprise first and second AND gates and an OR gate, said first AND gate having as one input said first frequency and said second AND gate having as one input said second frequency, said first AND gate having as a second input said incoming signal and said second AND gate having as a second input said inverted incoming signal, the outputs of said AND gates coupled through said OR gate to form said count output.

5. Apparatus according to claim 4, wherein said means for maintaining said counters at zero comprise means for ANDing the output of said detector with said incoming waveform or its inverse, said means to AND coupled to said associated counters such as to maintain an output which will be zero.

6. Apparatus according to claim 5, and further including means for deglitching said first and second outputs.

7. Apparatus according to claim 6, wherein said means for deglitching comprise D-type flip-flops and means for clocking said first and second output waveforms through said flip-flops at a rate at least in the order of magnitude greater than the frequency of said waveforms.

8. Apparatus according to claim 7, and further including means for deglitching said incoming signal.

9. Apparatus according to claim 5, and further including means for dividing said first frequency to obtain said second frequency.

10. Apparatus according to claim 9, wherein said means to divide comprise means to divide by 2 whereby waveforms with a 75% duty cycle, 180° out of phase will result at said first and second waveform outputs and further including means for ANDing said two waveforms to thereby form a waveform having a frequency which is twice that of the incoming square wave frequency.

11. Apparatus according to claim 3, wherein said means for maintaining said counters at zero comprise means for ANDing the output of said detector with said incoming waveform or its inverse, said means to AND coupled to said associated counters such as to maintain an output which will be zero.

12. Apparatus according to claim 3, and further including means for dividing said first frequency to obtain said second frequency.

13. Apparatus according to claim 3, including a second identical circuit having a selection circuit, third and fourth counters, third and fourth detectors and means for generating third and fourth output waveforms, and further including:

(a) means to provide said first counting frequency, said first counting frequency coupled as the first frequency input to said first circuit;

(b) means to divide said first counting frequency by 3 and to provide said second counting frequency input to said first circuit said second counting frequency also coupled as the second frequency input to said second circuit;

(c) means to divide said first frequency by 2 providing its output as the first frequency input to said second circuit;

(d) a first exclusive OR gate having said first output and said incoming square wave as inputs;

(e) a second exclusive OR gate having as inputs said second output and said fourth output;

(f) means for inverting said third output; and (g) an OR gate for combining the outputs of said first and second exclusive OR gates and said inverted third output to thereby provide a square wave having a frequency three times the input frequency.

14. Apparatus according to claim 3, wherein a plurality of said circuits are arranged in a MSI chip.

15. Apparatus according to claim 13, wherein said selection circuits each comprises first and second AND gates and an OR gate, said first AND gate having as one input said first frequency and said second AND gate having as one input said second frequency, said first AND gate having as a second input said incoming signal and said second AND gate having as a second input said inverted incoming signal, the outputs of said AND gates coupled through said OR gate to form said count output.

16. Apparatus according to claim 15, wherein said means for maintaining said counters at zero comprise means for ANDing the output of said detector with said incoming waveform or its inverse, said means to AND coupled to said associated counters such as to maintain an output which will be zero.

* * * * *